United States Patent
Chen et al.

[11] Patent Number: 5,966,392
[45] Date of Patent: Oct. 12, 1999

[54] BUTT-COUPLING PUMPED SINGLE-MODE SOLID-STATE LASER WITH FIBER-COUPLED DIODE

[75] Inventors: Yung-Fu Chen; Ting-Ming Huang; Ching-Fen Kao; Chi-Luen Wang; Jui-I Tsai, all of Hsinchu, Taiwan

[73] Assignee: National Science Council, Taipei, Taiwan

[21] Appl. No.: 08/910,627

[22] Filed: Aug. 13, 1997

[30] Foreign Application Priority Data

Feb. 28, 1997 [TW] Taiwan .................... 86203052

[51] Int. Cl.$^6$ ............. H01S 3/10; H01S 3/0941
[52] U.S. Cl. ................. 372/22; 372/75; 372/92
[58] Field of Search ............ 372/22, 75, 92; 385/88

[56] References Cited

U.S. PATENT DOCUMENTS

| | | | |
|---|---|---|---|
| 4,756,003 | 7/1988 | Baer et al. ........................ 372/75 |
| 4,847,851 | 7/1989 | Dixon ............................... 372/75 |
| 5,511,085 | 4/1996 | Marshall ........................... 372/22 |
| 5,539,765 | 7/1996 | Sibbett et al. .................... 372/92 |
| 5,802,086 | 9/1998 | Hargis et al. ..................... 372/22 |

OTHER PUBLICATIONS

Zayhowski, "Limits Imposed by Spatial Hole Burning on the Single–mode Operation of Standing–wave Laser Cavities", Optics Letters, vol. 15, No. 8, p. 431, Apr. 15, 1990.

*Primary Examiner*—James W. Davie
*Attorney, Agent, or Firm*—Fish & Richardson P.C.

[57] ABSTRACT

A butt-coupling pumped single-mode solid-state laser is provided for generating a laser of single-transverse and single-longitudinal mode. The butt-coupling pumped single-mode solid-state laser includes: (1) a laser diode having an output facet for producing a pumping light; (2) a laser crystal immediately connected to the output facet of the laser diode with a specific length therebetween for generating an excited light at a fundamental wavelength in response to the pumping light; and (3) a mirror disposed away from the laser crystal with a specific distance for emanating a laser output.

21 Claims, 3 Drawing Sheets

BUTT-COUPLING PUMPED SINGLE-MODE SOLID-STATE LASER WITH FIBER-COUPLED DIODE

FIELD OF THE INVENTION

The present invention is related to a diode-pumped solid-state laser, and especially relates to a butt-coupling pumped single-mode solid-state laser with a fiber-coupled diode.

BACKGROUND OF THE INVENTION

In the conventional diode-pumped solid-state laser, the profile of the exciting source (a high-power laser) is a strip of divergence (1 μm in width and 200~500 μm in length). Therefore, imaging elements such as coupling lens sets must be disposed between the pumping diode and the laser crystal to make the profile more symmetrical and direct the emanating beam to focus on the laser crystal. However, there are two alignment operations required for using coupling lens to emanate the beam from the pumping diode into the laser crystal. First of all, the imaging elements must be aligned corresponding to the output facet of the pumping diode. Second, the laser crystal must be properly aligned with diode-lens combination. These two operations need an extra adjusting motion along three orthogonal axes for the diode-pumped solid-state laser with a good output power. However, the alignment operation is relatively complicated and expensive.

In general, a diode-pumped solid-state laser includes a flat coupling mirror and a concave coupling mirror, both of which are disposed at two ends of the laser crystal respectively. It needs to precisely aim the focal point of the concave mirror and then adjust the slant angles of these two coupling mirrors. Therefore, an easy laser system is quite in demand and necessary in the practical applications.

A butt-coupled diode pumped laser has been disclosed in U.S. Pat. No. 4,848,815 to eliminate the complicated alignment operation in the pumped-diode solid-state laser as described above. The beam emanating from the pumping diode has a divergent light surface of strip shape. Consequencely, when the laser crystal is excited by the pumping beam, a high-order transverse mode of oscillation is generated and a single transverse laser with lower output power is obtained. Furthermore, the pumping diode is butt-coupled to the laser gain medium so that the heat emission from the pumping diode will decrease the performance and efficiency of the laser.

In order to obtain a single longitudinal-mode laser output, a microchip served as a cavity has been disclosed by Zayhowski in Opt. Lett. Vol. 15, No. 8, pp. 431–433, 1990. However, when the laser crystal is end pumped, a thermal lens effect will be generated because the length of the cavity is so short (about 1 mm) that the mode-to-pump size ratio is less than 0.6 resulting in high-order transverse mode of oscillation. In addition, other devices such as frequency-doubling crystals and Q-switches can not be disposed in the cavity so that its application is restricted.

It is obvious that the above-described diode-pumping solid-state lasers have some drawbacks as follows:

(1) It is relatively complicated to set up the laser system;
(2) The performance and efficiency of the butt-coupled diode-pumped solid-state laser will be decreased by the heat emission from the pumping diode;
(3) The cavity with a short length for generating a single longitudinal-mode laser will be disturbed by the thermal lens effect.

SUMMARY OF THE INVENTION

An object of the present invention is to provide a easily assembled butt-coupling pumped single-mode solid-state laser with high accuracy and efficiency.

Another object of the present invention is to provide a laser device generating a laser of single-transverse and single-longitudinal modes and having a stable resonant cavity with good overlap of laser mode and pump size.

A preferred embodiment according to the present invention is a laser device including: (1) a laser diode having an output facet for producing a pumping light; (2) a laser crystal immediately connected to the output facet of the laser diode with a specific length therebetween for generating an excited light at a fundamental wavelength in response to the pumping light; and (3) a mirror disposed away from the laser crystal with a specific distance for emanating a laser output.

In accordance with one aspect of the present invention, the laser diode is a fiber-coupled laser diode.

In accordance with another aspect of the present invention, the specific length between the output facet of the laser diode and the laser crystal is less than 1 mm.

In accordance with another aspect of the present invention, the laser crystal is made of a material selected from one group consisting of $Nd:YVO_4$, Nd:YAB, and Nd:YSAG.

In accordance with another aspect of the present invention, the mirror is a flat output-coupling mirror.

In accordance with another aspect of the present invention, the specific distance between the laser crystal and the mirror is ranged from 0 to 50 mm for obtaining a mode-to-pump size greater than 0.6 that a single mode laser can be generated.

In accordance with another aspect of the present invention, the laser crystal and the mirror form a flat-flat resonant optical cavity.

In accordance with another aspect of the present invention, the laser crystal has an input facet covered with a highly reflective coating for reflecting the excited light at the fundamental wavelength and serving as a reflecting mirror for the flat-flat resonant optical cavity.

In accordance with another aspect of the present invention, the laser crystal has an output facet coated with an anti-reflective coating for keeping the excited light at the fundamental wavelength in the laser crystal as much as possible.

In accordance with another aspect of the present invention, the mirror has an input facet coated with a partially reflective coating for partially reflecting the excited light at the fundamental wavelength.

Another object of the present invention is to provide another preferred embodiment.

The another preferred embodment according to the present invention is a laser device including: (1) a laser diode having an output facet for producing a pumping light; (2) a laser crystal immediately connected to the output facet of the laser diode with a specific length therebetween for generating an excited light at a fundamental wavelength in response to the pumping light; and (3) a frequency-doubling crystal disposed away from the laser crystal with a specific distance for converting the excited light at the fundamental wavelength to an excited light at a second harmonic wavelength and emanating a laser output formed from the excited light at the second harmonic wavelength.

In accordance with one aspect of the present invention, the laser diode is a fiber-coupled laser diode.

In accordance with another aspect of the present invention, the specific length between the output facet of the laser diode and the laser crystal is less than 1 mm.

In accordance with another aspect of the present invention, the laser crystal has an input facet coated with a highly reflective coating for reflecting the excited lights at the fundamental wavelength and at the harmonic wavelength to be served as a reflecting mirror and an output facet coated with an anti-reflection coating for keeping the excited light at the fundamental wavelength in the laser crystal as much as possible.

In accordance with another aspect of the present invention, the laser crystal is made of a material selected from one group consisting of Nd:YVO$_4$, Nd:YAB, and Nd:YSAG.

In accordance with another aspect of the present invention, the specific distance between the laser crystal and the frequency-doubling crystal is ranged from 0 to 50 mm for obtaining a mode-to-pump size greater than 0.6 that a single mode laser can be generated.

In accordance with another aspect of the present invention, the laser crystal and the frequency-doubling crystal form a flat-flat resonant optical cavity.

In accordance with another aspect of the present invention, the frequency-doubling crystal has an input facet coated with an anti-reflective coating for keeping the excited lights both at the fundamental wavelength and the second harmonic wavelength in the flat-flat resonant optical cavity.

In accordance with another aspect of the present invention, the frequency-doubling crystal has an output facet covered with a bi-chromatic coating for reflecting the excited light at the fundamental wavelength back to the flat-flat resonant optical cavity but the excited light at the second harmonic wavelength passes through the bi-chromatic coating.

Another object of the present invention is to provide further another preferred embodiment.

The further another preferred embedment is a laser device including: (1) a fiber-coupled laser diode having an output facet for producing a pumping light; and (2) a laser crystal immediately connected to the output facet of the fiber-coupled laser diode with a specific length for generating an excited light at a fundamental wavelength in response to the pumping light and emanating a laser output.

In accordance with one aspect of the present invention, the laser crystal has an input facet and an output outfacet covered with a highly reflective coating and a partially reflective coating respectively.

In accordance with another aspect of the present invention, a selected length of the laser crystal is based on a mode-to-pump size ratio which is set greater than 0.6 for obtaining a single mode laser.

The present invention may best be understood through the following description with reference to the accompanying drawings, in which:

DETAILED DESCRIPTION OF THE PREFERRED EMBODIMENT

Figure 1:
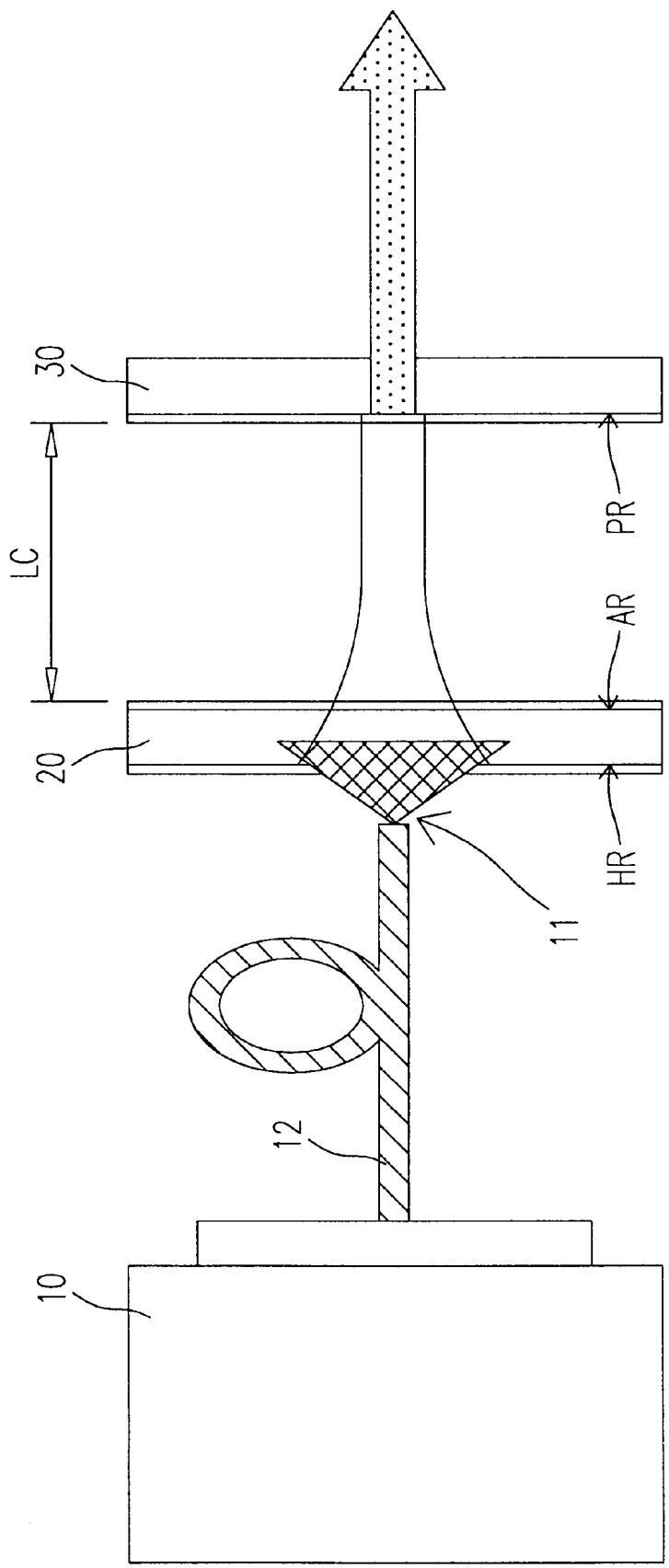
FIG. 1 is a shematic diagram showing the first preferred embodiment according to the present invention.

Referring to FIG. 1 showing a preferred embodiment of the present invention, the laser device includes a fiber-coupled laser diode 10, a laser crystal 20, and a flat output-coupling mirror 30, wherein the laser crystal 20 and the flat output-coupling mirror 30 form a flat-flat resonant optical cavity. The output facet 11 of a fiber-coupled laser diode 10 is directly coupled to the laser crystal 20. The laser crystal 20 can be made of a gain material (e.g. Nd:YVZO$_4$, Nd:YAB, or Nd:YSAG) or other active material with high absorptive characteristics. Here, Nd:YVO$_4$ is chosen as the laser crystal. The fiber-coupled laser diode 10 (e.g. SDL-2372-P3) serves as a source of a pumping light. The fiber-coupled laser diode 10 has a nominal output power of 1.2 W at 809 nm, a core fiber 12 at 100 $\mu$m, and a ~26° half width at 1/e$^2$ of the peak intensity. The fiber-coupled laser diode is coupled to the laser crystal 20 through the core fiber 12 and thus the input facet of the laser crystal 20 is well isolated from the fiber-coupled laser diode 10 such that the heat emission from the pump diode will not influence performance of the laser.

The input facet of the laser crystal 20 is coated with a highly reflective coating HR for reflecting the excited light at the fundamental wavelength, generated from the laser crystal 20 after being excited by the pumping light, and serving as a reflecting mirror for the flat-flat resonant optical cavity. The reflectivity of the highly reflective coating HR should be greater than 99.8%. The output facet of the laser crystal 20 is coated with an anti-reflective coating AR, the reflectivity of which should be less than 0.2% to keep the excited light at the fundamental wavelength in the laser crystal 20 as much as possible. The input facet of the flat output-coupling mirror 30 is also coated with a partially reflective coating PR with a reflectivity of 90% for partially reflecting the excited light at the fundamental wavelength.

Although the cavity of the conventional diode-pumped laser is not very stable resulting from using a fiber-coupled laser diode as a pumping light source, the circular-symmetrical thermal lens effect can improve the stability of the flat-flat resonant optical cavity with a good overlap of the laser mode and pump focus in the present invention. When the length LC of the flat-flat resonant optical cavity is ranged between 0 and 50 mm, the mode-to-pump size ratio is about 1.0~2.0 and thus better overlap efficiency can be obtained. Consequently, the single-longitudinal mode laser can be generated easily. If the laser crystal 20 (Nd:YVO$_4$) is excited by a pumping light at a wavelength of 809 nm with a power of 1.2 W, the laser crystal 20 emanates a laser output of single transverse and longitudinal modes with a power of 620 mW at a wavelength of 1064 nm. The generated output power is about 5~6 times more than the expected output power.

Figure 2:
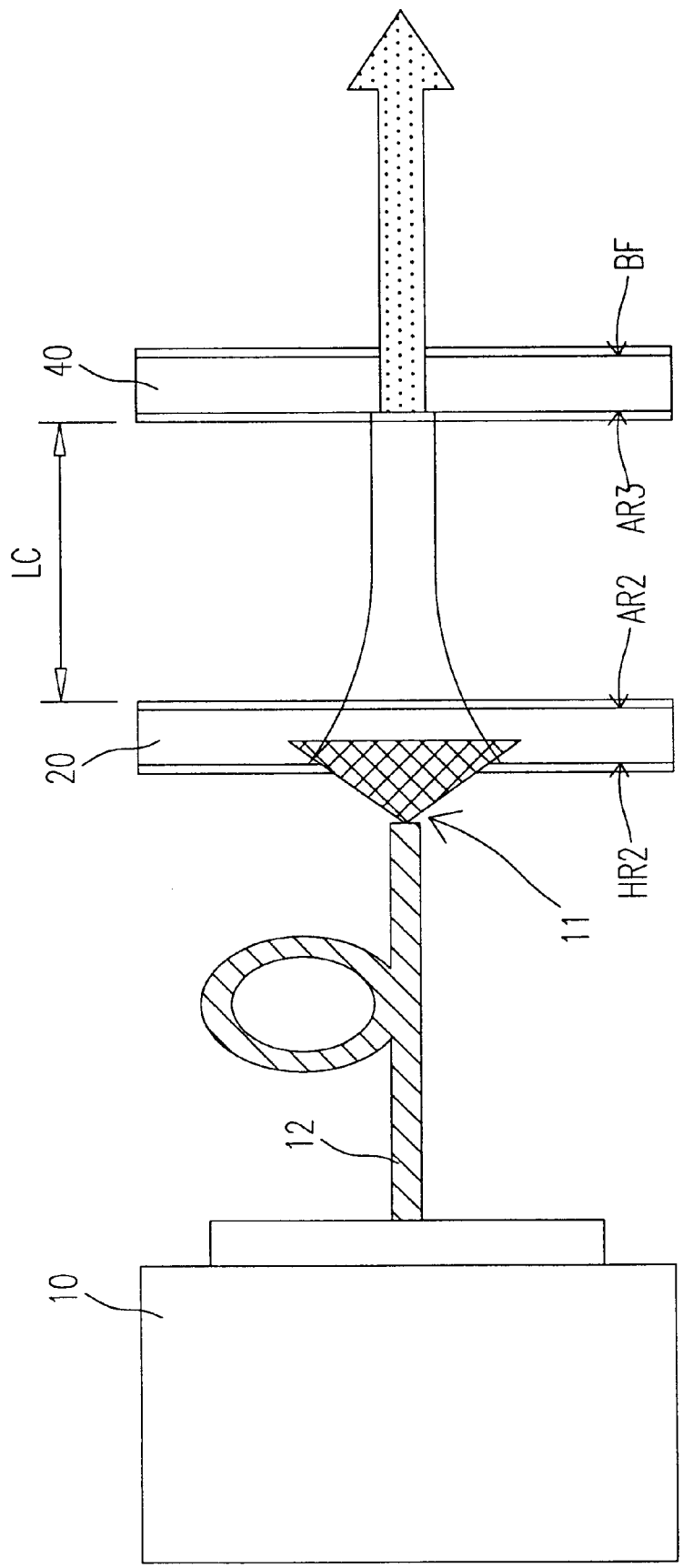
FIG. 2 is a schematic diagram showing the second preferred embodiment according to the present invention.

Please refer to FIG. 2 showing another embodiment according to the present invention. The mechanism is almost the same as that in FIG. 1 except that the flat output-coupling mirror 30 in FIG. 1 is replaced by a frequency-doubling crystal 40. In order to reduce the power loss, the additional flat output-coupling mirror is removed. After being excited by the pumping light, the laser crystal generates the excited light at the fundamental wavelength in response to the pumping light and then the excited light at the fundamental wavelength is converted to an excited light at the second harmonic wavelength by the flat output-coupling mirror 30. The input facet of the laser crystal 20 is coated with a highly reflective coating HR2 for reflecting the excited light at the fundamental wavelength and at the second harmonic wavelength and serving as a reflecting mirror of the flat-flat resonant optical cavity. The reflectivity of the highly reflective coating HR2 should be greater than 99.8% for the excited light at the fundamental length and greater than 98% for the excited light at the second harmonic length. The output facet of the laser crystal 20 is coated with an anti-reflective coating AR2, the reflectivity of which should be less than 0.2% so as to keep the excited light at the fundamental wavelength in the laser crystal 20 as much as possible.

In addition, the input facet of the frequency-doubling crystal 40 is coated with an anti-reflective coating AR3 for emanating the excited light at the fundamental length and the excited light at the second harmonic length. The output facet of the frequency-doubling crystal 40 is coated with a bi-chrimatic coating BF for reflecting the excited light at the fundamental length back to the flat-flat resonant optical cavity. However, the excited light at the second harmonic wavelength can pass through the bi-chrimatic coating BF to form a laser output.

When the length LC of the flat-flat resonant optical cavity is ranged between 0 and 50 mm, the mode-to-pump size ratio is about 1.0~2.0 and thus better overlap efficiency can be obtained. If the laser crystal ($Nd:YVO_4$) is excited by a pumping light at a wavelength of 809 nm with a power of 1.2 W, a green laser of single transverse and single longitudinal modes with a power of 200 mW will be obtained.

Figure 3:
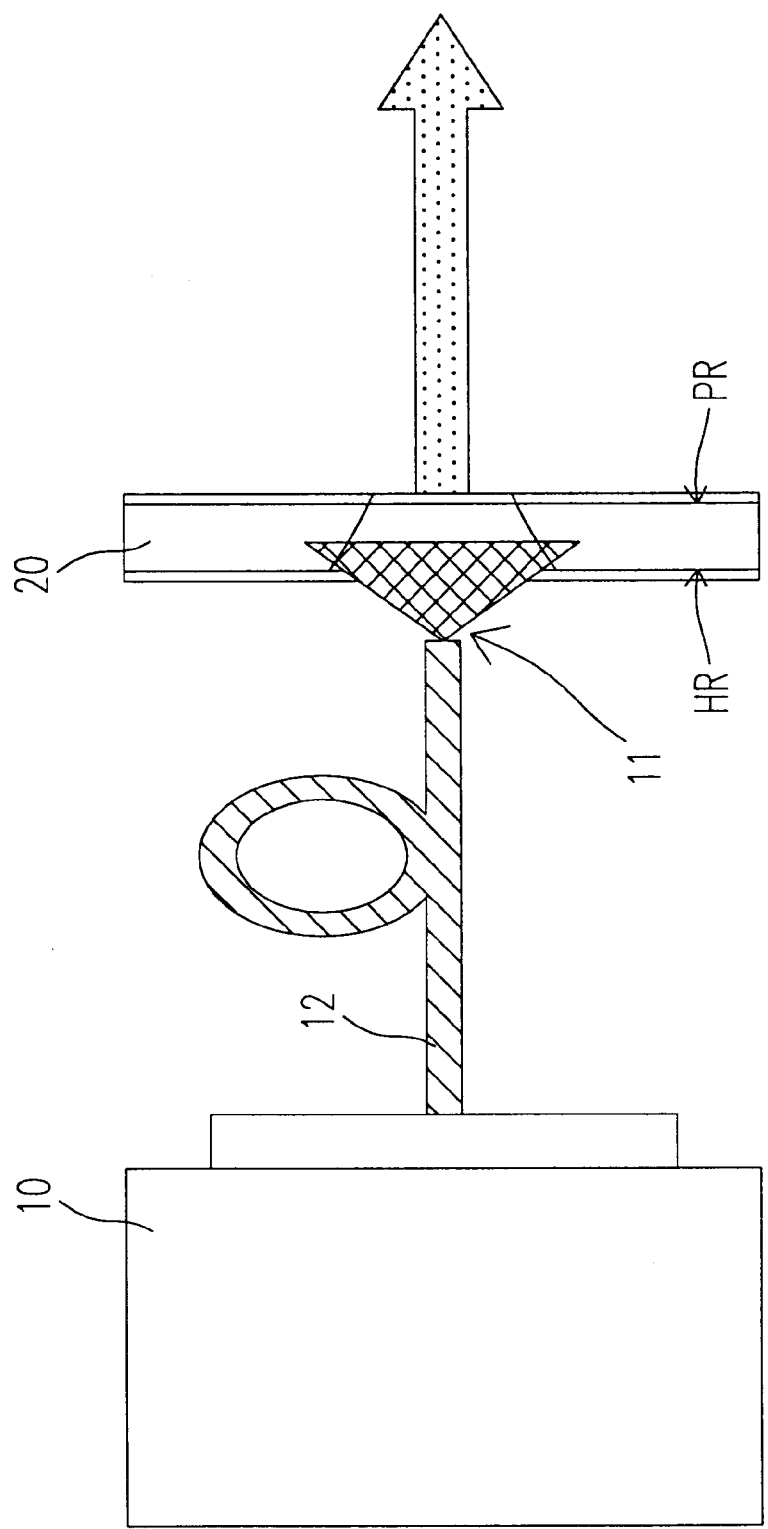
FIG. 3 is a shematic diagram showing the third preferred embodiment according to the present invention.

As shown in FIG. 3, the length LC of the flat-flat resonant optical cavity is set to 0 mm. A simpler flat-flat resonant optical cavity can be obtained by removing the flat output-coupling mirror 30 and the anti-reflective coating AR on the output facet of the laser crystal 20 as shown in FIG. 1. The flat-flat resonant optical cavity only includes a laser crystal 20, the input facet and output facet of which are coated with a highly reflective coating HR and a partially reflective coating PR respectively. The selected length of the laser crystal 20 is based on the mode-to-pump size ratio for generating a single mode oscillation. In the present invention, the selection rule for the length of the laser crystal 20 is different from the previous microchip-laser design in which the length of the laser crystal is so short that the spacing mode is larger than gain bandwidth. The previous design criterion for single mode oscillation is not necessary but the mode-to-pump size ratio is the key parameter for single mode oscillation in the present invention. According to the present invention, the mode-to-pump size ratio is larger than 0.6 to obtain a single mode operation.

To sum up, the present invention not only provides a laser of single-transverse and single-longitudinal modes but also provides a stable resonant cavity with good overlap of laser mode and pump size due to the thermal lens effect in the flat-flat resonant optical cavity. The output facet of the fiber-coupling laser diode is butt-coupled to the input facet of the laser crystal so that this fiber coupling laser diode can be well isolated from the laser crystal. Therefore, the heat emission from the laser diode will not influence the laser operation. According to the present invention, the complicated process for aiming the focal point can be eliminated and it is very easy to set up the laser system with high accuracy and efficiency.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A laser device for obtaining a single mode laser comprising:
    a fiber-coupled laser diode having an output facet for producing a pumping light;
    a laser crystal closely connected to said output facet of said laser diode with a specific length therebetween for generating an excited light at a fundamental wavelength in response to said pumping light; and
    a mirror disposed away from said laser crystal with a specific distance for emanating a laser output.

2. A laser device according to claim 1 wherein said specific length between said output facet of said laser diode and said laser crystal is less than 1 mm.

3. A laser device according to claim 1 wherein said laser crystal is made of a material selected from one group consisting of $Nd:YVO_4$, Nd:YAB, and Nd:YSAG.

4. A laser device according to claim 1 wherein said mirror is a flat output-coupling mirror.

5. A laser device according to claim 1 wherein said specific distance between said laser crystal and said mirror is ranged from 0 to 50 mm for obtaining a mode-to-pump size greater than 0.6 that said single mode laser can be generated.

6. A laser device according to claim 5 wherein said laser crystal and said mirror form a flat-flat resonant optical cavity.

7. A laser device according to claim 6 wherein said laser crystal has an input facet covered with a highly reflective coating for reflecting said excited light at said fundamental wavelength and serving as a reflecting mirror for said flat-flat resonant optical cavity.

8. A laser device according to claim 6 wherein said laser crystal has an output facet coated with an anti-reflective coating for keeping said excited light at said fundamental wavelength in said laser crystal as much as possible.

9. A laser device according to claim 1 wherein said mirror has an input facet coated with a partially reflective coating for partially reflecting said excited light at said fundamental wavelength.

10. The laser device of claim 1 wherein the laser crystal is configured to generate the excited light at a single fundamental wavelength.

11. A laser device for obtaining a single mode laser comprising:
    a fiber-coupled laser diode having an output facet for producing a pumping light;
    a laser crystal closely connected to said output facet of said laser diode with a specific length therebetween for generating an excited light at a fundamental wavelength in response to said pumping light; and
    a frequency-doubling crystal disposed away from said laser crystal with a specific distance for converting said excited light at said fundamental wavelength to an excited light at a second harmonic wavelength and emanating a laser output formed from said excited light at said second harmonic wavelength.

12. A laser device according to claim 11 wherein said specific length between said output facet of said laser diode and said laser crystal is less than 1 mm.

13. A laser device according to claim 11 wherein said laser crystal has an input facet coated with a highly reflective coating for reflecting said excited lights at said fundamental wavelength and at said harmonic wavelength to be served as a reflecting mirror and an output facet coated with an anti-reflection coating for keeping said excited light at said fundamental wavelength in said laser crystal as much as possible.

14. A laser device according to claim 11 wherein said laser crystal is made of a material selected from one group consisting of Nd:YVO$_4$, Nd:YAB, and Nd:YSAG.

15. A laser device according to claim 11 wherein said specific distance between said laser crystal and said frequency-doubling crystal is ranged from 0 to 50 mm for obtaining a mode-to-pump size greater than 0.6 that said single mode laser can be generated.

16. A laser device according to claim 15 wherein said laser crystal and said frequency-doubling crystal form a flat-flat resonant optical cavity.

17. A laser device according to claim 16 wherein said frequency-doubling crystal has an input facet coated with an anti-reflective coating for keeping said excited lights both at said fundamental wavelength and said second harmonic wavelength in said flat-flat resonant optical cavity.

18. A laser device according to claim 16 wherein said frequency-doubling crystal has an output facet covered with a bi-chromatic coating for reflecting said excited light at said fundamental wavelength back to said flat-flat resonant optical cavity but said excited light at said second harmonic wavelength passes through said bi-chromatic coating.

19. The laser device of claim 11 wherein the laser crystal is configured to generate the excited light at a single fundamental wavelength.

20. A laser device for obtaining a single mode laser comprising:
   a fiber-coupled laser diode having an output facet for producing a pumping light; and
   a laser crystal closely connected to said output facet of said fiber-coupled laser diode with a specific length for generating an excited light at a fundamental wavelength in response to said pumping light and emanating a laser output, and having a selected length based on a mode-to-pump size ratio greater than 0.6 for obtaining said single mode laser.

21. A laser device according to claim 20 wherein said laser crystal has an input facet and an output outfacet covered with a highly reflective coating and a partially reflective coating respectively.

* * * * *